J. A. Whitney.
Milk Cooler.
Nº 93,936.        Patented Aug. 17, 1869.
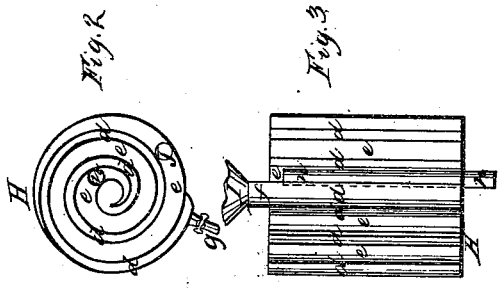
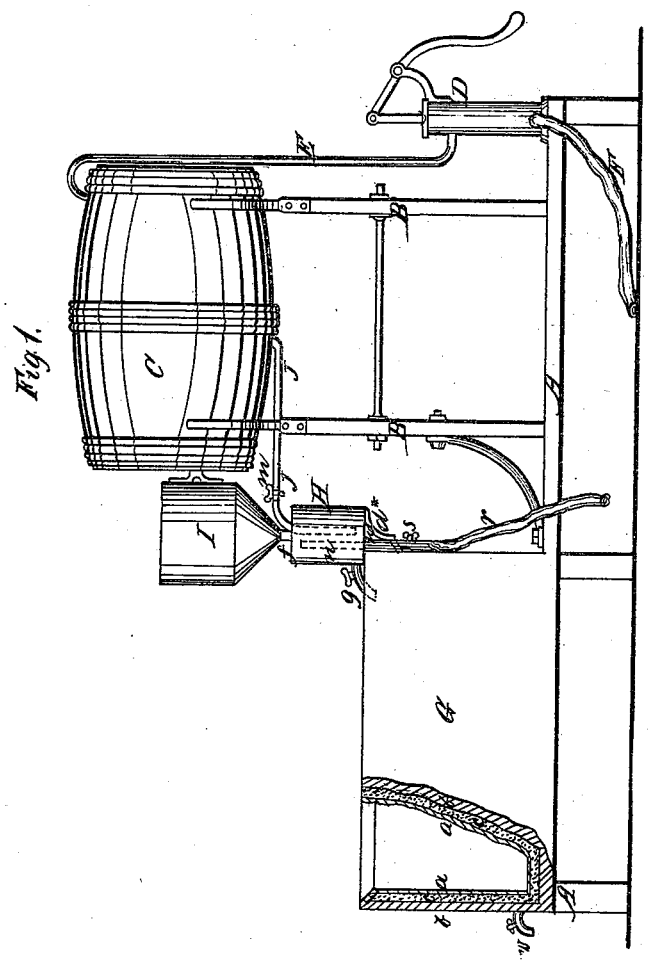
Witnesses.
Wm R. Whitney
B. C. Gregory.
Inventor.
James A Whitney

United States Patent Office.

JAMES A. WHITNEY, OF NEW YORK, N. Y.

Letters Patent No. 93,936, dated August 17, 1869.

IMPROVEMENT IN DAIRY-APPARATUS.

The Schedule referred to in these Letters Patent and making part of the same.

*To all whom it may concern:*

Be it known that I, JAMES A. WHITNEY, formerly of Maryland, in the county of Otsego, and State of New York, but now of the city, county, and State of New York, have invented certain new and useful Improvements in Dairy-Apparatus; and I do hereby declare that the following is a full, clear, and exact description of the same, reference being had to the accompanying drawings, making a portion of this specification, in which—

Figure 1 is a side elevation and partial section of an apparatus made according to my invention.

Figure 2 is a horizontal section of one portion of the same, on an enlarged scale.

Figure 3 is a vertical section of the same portion, also on an enlarged scale.

Similar letters of reference indicate corresponding parts in all the figures.

The object of this invention is to provide an apparatus, whereby milk may be quickly deprived of its animal heat, and conveyed to a receptacle provided for holding the same, in order that the separation of the cream therefrom may be secured in a speedy and effectual manner, and whereby, furthermore, the performance of all the operations necessary or incidental to such separation, may be carried out with the least outlay of labor, and with the greatest degree of facility and convenience; and to this end, My invention consists in the combination, with a milk-cooler of suitable construction, of an elevated reservoir, or source of supply of cooling-liquid, and an elevated milk-holder, suitably arranged and organized for the milk and the cooling-liquid to flow simultaneously through the cooler.

To enable others to understand the construction and operation of my invention, I will proceed to describe it, with reference to the drawings.

A is a horizontal frame-work, of wood or other material.

This frame-work is provided, at one end, with uprights B, which sustain a water-reservoir, C. This latter may consist of any suitable vessel, as, for instance, a cask or barrel.

Attached to the frame-work, in suitable proximity to the water-reservoir C, is a pump, D, of any appropriate construction.

The outlet-pipe E of this pump extends upward, and enters the reservoir C, at the upper part thereof, and the inlet-pipe F of such pump may be of flexible hose.

In the operation of filling the reservoir C, as presently herein explained, this inlet-pipe F is extended to a well, spring, or other source of water-supply.

At the opposite end of the frame-work A is a tank, G, which may be of rectangular form. It is preferred that this tank have a metallic lining, $a$, between which and the external shell $b$ is a layer, $c$, composed of sawdust, powdered charcoal, or similar non-conductor of heat.

This tank should, furthermore, be provided with a lid or cover, which may be of any suitable kind.

Placed at the inner end of the tank G, upon a suitable bracket or support $d^*$, is the cooling-device H, which may be described as follows:

The device is formed of thin sheet-metal, and, externally, may be nearly or quite cylindrical in shape. The vertical sheet-metal plates, of which it is composed, are so arranged that a coiled passage, $d$, is provided between them. Intermediate with or between the folds of this passage $d$, are those of another coiled passage, $e$. The passage $d$ is closed at top and bottom, but at the top of its central or innermost end or portion, communicates by means of a neck, $f$, with a milk-holder or vessel, I, which may be of any desired form. At the bottom of the outer end or portion of the passage $d$, is an outlet-cock or faucet, $g$, which projects past or over the inner edge of the tank. The passage $e$ is, of course, closed at the bottom, and, if preferred, may also be closed at the top. A pipe, J, furnished with a stop-cock, $m$, extends from the lower part of the water-reservoir nearly to the bottom of the passage $e$, at the outer end or portion thereof. At the central or inner end or portion of this last-named passage $e$, is a vertical tube, $n$, which extends upward nearly to the top of the passage, and which, passing through the bottom of the latter, may have secured or connected to its lower extremity, a waste or conduit-pipe, $r$. The tube $n$ is, furthermore, provided with a stop-cock, $s$.

In order to use the apparatus, the pump D is operated to fill the reservoir C with water from the well, spring, or other source of supply, care being, of course, taken that this water be at a temperature lower than that to which it is desired to cool the milk. This being done, and the milk to be cooled being placed in the milk-holder I, the cocks $g$ $m$ $s$ are opened to permit the milk to flow from the milk-holder through the passage $d$ of the cooling-device H, and to allow the water from the reservoir C to flow to the passage $e$ of such device.

The milk flows through the passage $d$ in one direction, and makes its exit through the cock $g$. Simultaneously with this, the water flows in an opposite direction through the passage $e$, and passes out through the tube $n$, and the conduit-pipe attached thereto.

The heat radiated or conducted from the milk as it passes through the cooling-device, in the manner just set forth, is absorbed by the water, and the milk is thus deprived of its animal heat, or, in other words, is quickly and suddenly cooled. Passing into the tank G, the milk may be suffered to remain therein until the cream shall have risen, it being ascertained by experiment, that when milk is thus suddenly or quickly deprived of its animal heat, the cream will rise to the surface thereof, even though the depth of the mass of milk may be many times that of the milk placed in pans in the ordinary manner, the cream, furthermore, rising in a much less period of time than when the milk is treated in the just-mentioned ordinary way.

The flow of milk through the passage $d$ may be regulated, by turning the cock $g$, to limit to the requisite degree the discharge of the milk therefrom, and, in like manner, the flow of the water through the passage $e$ may be controlled through the agency of the cocks $m$ $s$, or, when the passage $e$ is closed at the top, by the cock $s$ alone, so that by this means the proportion between the quantity of water flowing through the passage $d$, and that of the milk passing through the passage $e$, requisite to insure the desired abstraction of heat from the milk, may be readily insured.

When the cream has wholly risen upon the milk in the tank, it may be removed therefrom with a dipper or like appliance, and the milk remaining may be drawn from the tank by means of a faucet, $w$.

What I claim as my invention, and desire to secure by Letters Patent, is—

The combination, with a milk-cooler, of an elevated reservoir for cooling-liquid, and an elevated milk-holder, suitably arranged and organized for the milk and the cooling-liquid to flow simultaneously through the cooler, substantially as herein described.

JAMES A. WHITNEY.

Witnesses:
WM. R. WHITNEY,
B. C. GREGORY.